Jan. 5, 1926.
F. STUHR
1,568,253
BEAN SEPARATOR
Filed April 14, 1925    2 Sheets-Sheet 1
Fig. 1.
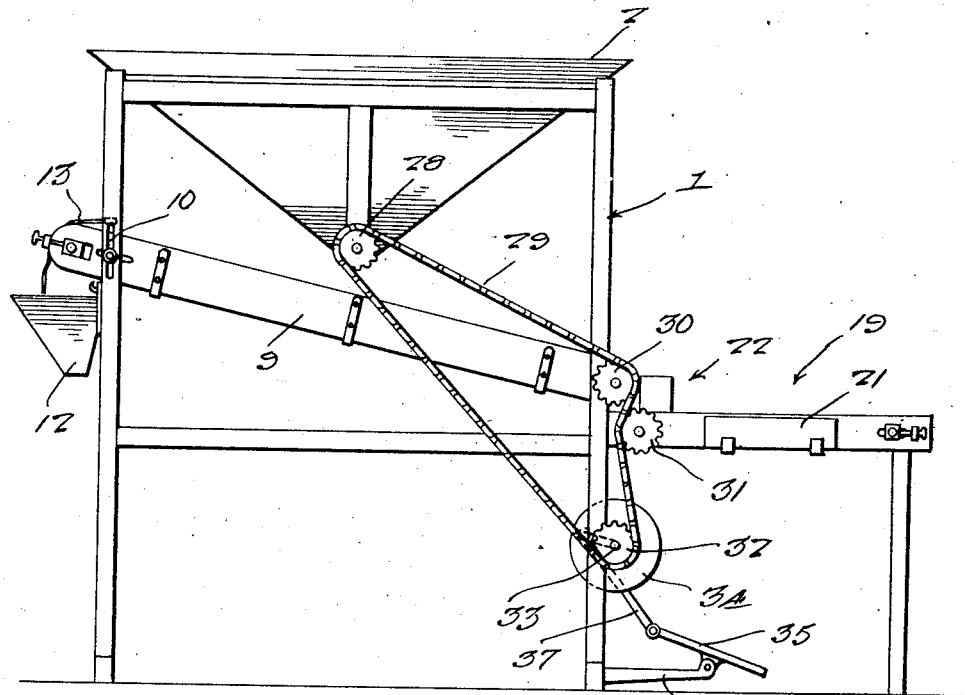
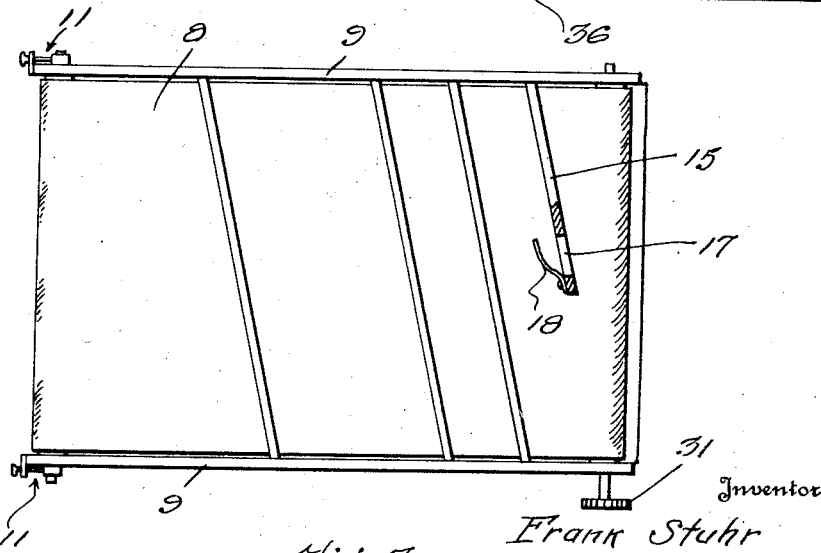
Fig. 3.
Inventor
Frank Stuhr
By
Clarence O'Brien
Attorney.

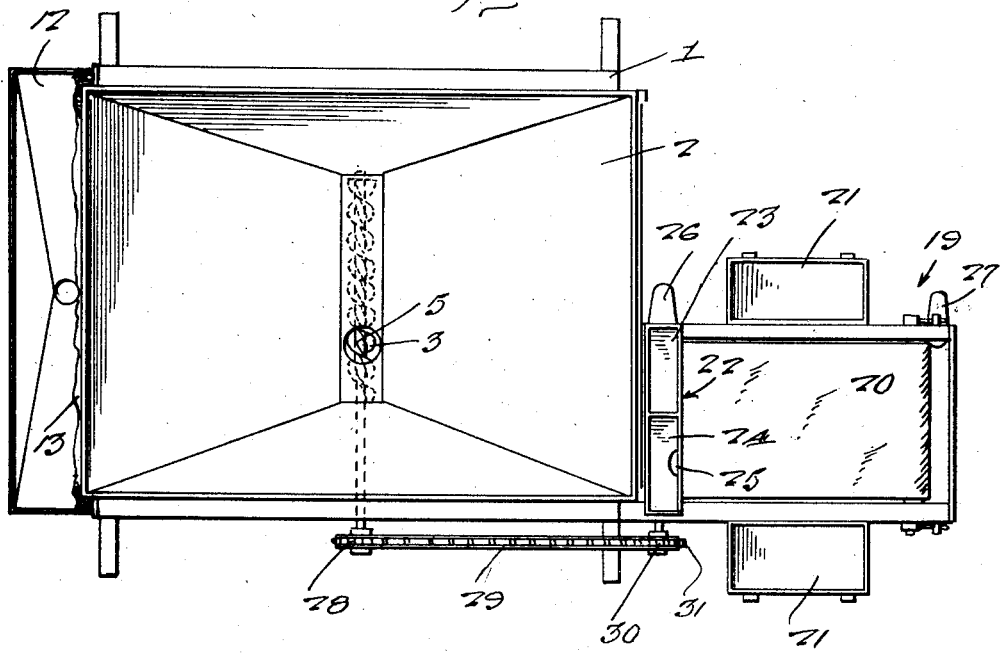
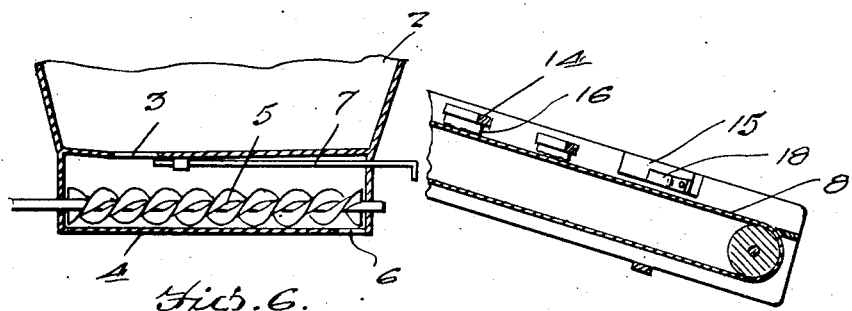
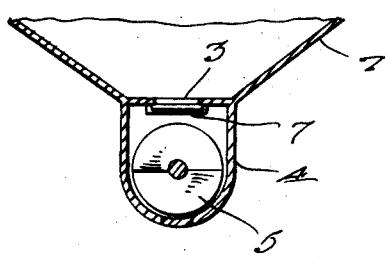

Patented Jan. 5, 1926.

1,568,253

UNITED STATES PATENT OFFICE.

FRANK STUHR, OF RHODES, MICHIGAN.

BEAN SEPARATOR.

Application filed April 14, 1925. Serial No. 23,011.

*To all whom it may concern:*

Be it known that I, FRANK STUHR, a citizen of the United States, residing at Rhodes, in the county of Gladwin and State of Michigan, have invented certain new and useful Improvements in Bean Separators, of which the following is a specification.

This invention relates to an improved machine for separating beans, to permit them to be graded for filling bags to be transported to the market.

The invention has more specific reference to a machine into which the various sizes of beans are dumped to be separated and graded, the beans falling onto an endless apron, which is inclined on an angle to cause certain of the beans to gravitate downwardly, while permitting other beans to be carried upwardly, there being collection bags or receptacles at the opposite ends of the apron, into which the graded beans are discharged.

In addition to this self acting means for separating the beans, there is a hand picking table located at the lower end of the apron, so that the partially graded beans discharged onto this table may be further sorted by the hands of the picker, whereby to permit the seed beans to be separated from the edible beans.

Other features and advantages of the invention will become apparent from the following description and drawings.

In the accompanying drawings, forming a part of this specification, and in which like numerals are employed to designate like parts throughout the same:

Figure 1 is a side elevation of a machine embodying the invention.

Figure 2 is a top plan view of the same.

Figure 3 is a top plan view of the endless apron.

Figure 4 is a cross section through a feed screw carried by a hopper.

Figure 5 is a detail sectional view through a portion of the apron.

Figure 6 is an enlarged detail view through the slide valve shown in Figure 4.

Referring to the drawings, the reference character 1 designates a supporting frame for a hopper 2. The hopper 2 is provided at the center of its bottom with a restricted discharge opening 3, emptying into an elongated box 4, in which a screw 5 is mounted for rotation. The box is provided at one end of the bottom with a hole 6, through which the beans slowly pass. It will be observed that the side plate 7 is mounted in the box and is adapted to cover the opening 3, whereby to cut off the supply of beans or to restrict the number of beans discharged through the hopper.

Disposed beneath the discharge of the hopper is an endless pendent apron 8, mounted upon rollers which are journaled for rotation between pairs of spaced side bars 9. It should be observed that this apron is supported on an incline and has adjustable pin and slot connections as at 10, at its upper end to permit the inclination to be varied slightly. Also appropriate means 11 is provided at this end for adjusting the upper roller to permit the canvas to be stretched more tightly. It will be seen from Figure 1 that a collecting trough 12 is supported upon the frame beneath the upper end of the apron, and that this upper end projects over the open top of the trough. Observing Figure 1, it will be seen that a fabric guard 13 is employed at this point, and the free end portion thereof overhangs the adjacent end of the apron, this guard serving to prevent beans from being literally thrown over top of the hopper. In other words, the guard constitutes a guide for more effectively directing the beans into the hopper.

As shown better in Figures 3 and 5, diagonal strips 14 and a half-strip 15 are disposed between the side bars 9. These strips are spaced above the surface of the apron and carry depending flexible flaps 16. These flaps may be of suitable fabric and may be fringed if desired. It will be noted more particularly from Figure 3 that an elongated slot 17 is formed in the strip 15, adjacent the free end thereof, and that a guide finger 18 is carried by this strip and is spaced from the opening 17. This opening is of a predetermined size, so that only beans of a particular size are allowed to pass therethrough.

As before stated, a hand picking table 19 is located at the lower end of the apron, and as shown better in Figure 2, the table comprises an endless conveyor 20, a pair of side boxes 21, and an elongated box-like receptacle 2. This receptacle is divided into compartments 23 and 24, the bottom of the last named compartment being provided with an opening 25, through which beans are allowed to pass. A discharge spout 26 communicates with the compartment 23. There is also a discharge spout 27 at the end of the table where the operator sits or stands.

Appropriate means is provided for simultaneously operating the endless apron, the endless conveyor, and the feed screw in the hopper, and in this connection, the shaft of the screw is formed with a small sprocket wheel 28 over which a sprocket chain 29 is trained. The chain also extends about another sprocket wheel 30 connected with the shaft of the lowermost roller of the apron. The endless conveyor 20 has the roller adjacent the frame provided with a sprocket wheel 31, which is also operated by the chain. The chain receives the motion from the sprocket 32, mounted upon the manually operated crank shaft 33. To facilitate rotation of the shaft, it is provided with a fly wheel 34. For operating it, a pivoted foot pedal 35 is mounted upon a supporting bracket 36 and is connected with the crank of the shaft through the medium of the link 37.

Upon operating the pedal 35, the rotary screw 5, endless apron 8, and endless conveyor 20 are simultaneously operated. It will thus be seen that the beans placed in the hopper 2 will drop through the discharge opening 3 and will be fed along by the screw 5 into and through the discharge hole 6. The discharge of the beans can be controlled by the slide valve 7. The ungraded beans drop upon the upwardly moving upper flight of the apron between the two bars 14 disposed beneath the discharge hole 6. The larger and flat beans will literally cling to the apron and will be carried on upwardly therewith and dropped into the trough 12. The sack will be hooked upon this trough to collect these beans. The smaller and round beans will roll downwardly under the action of gravity despite the upward movement of the apron. In case, any flat sided beans be rolled down, they will encounter the flexible flaps upon the bars 14, and will be turned over upon their flat sides and carried upwardly by the apron. The round beans will, however, in some instances, hop over the bars, or will pass beneath the flaps and downwardly onto the hand picker's table. Some beans will encounter the short strip 15 and be automatically diverted into the compartment 23 of the receptacle 22, while others will escape this obstruction and pass through the existing space into the compartment 24. The beans dropping into the receptacle 22 will be under the eyes of the picker at the table and he may sort these at his discretion, either into the boxes 21 or allow them to pass through the desired spouts 26 or 27, into sacks which will be connected with each spout.

It is thought that persons familiar with machines of this class will appreciate the advantages derived therefrom and the facility with which the beans may be accurately separated and sorted.

Therefore a more lengthy description is thought unnecessary.

While the preferred embodiment of the machine has been shown and described, it is to be understood that minor changes coming within the field of invention claimed may be resorted to, if desired.

I claim:

In a bean separator of the class described, an inclined frame, rollers journaled for rotation in said frame, an endless apron trained over said rollers, a plurality of transverse strips supported between the side bars of the frame, said strips being spaced longitudinally from each other, and disposed diagonally to the path of movement of the apron, flexible flaps on the under sides of the strips disposed adjacent the surface of the apron, a relatively short strip below the lowermost of the aforesaid strips, said short strip being disposed diagonally and provided adjacent its free end with a bean hole of a predetermined size, and a guide finger carried by the end portion of the strip and disposed in association with said hole.

In testimony whereof I affix my signature.

FRANK STUHR.